(12) United States Patent
Lam et al.

(10) Patent No.: US 12,361,337 B2
(45) Date of Patent: Jul. 15, 2025

(54) MULTI-FACTOR AVAILABLE WORKSPACE RESERVATION RECOMMENDATION

(71) Applicant: Zoom Video Communications, Inc., San Jose, CA (US)

(72) Inventors: Wing Hong Michael Lam, Sammamish, WA (US); Cynthia Eshiuan Lee, Austin, TX (US); Carleigh Pereira Noble, Chicago, IL (US); Jeffrey William Smith, Milpitas, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/733,405

(22) Filed: Apr. 29, 2022

(65) Prior Publication Data

US 2023/0351271 A1 Nov. 2, 2023

(51) Int. Cl.
  *G06Q 10/02* (2012.01)
(52) U.S. Cl.
  CPC .................... *G06Q 10/02* (2013.01)
(58) Field of Classification Search
  CPC ...................................... G06Q 10/02
  See application file for complete search history.

(56) References Cited

U.S. PATENT DOCUMENTS

| 7,054,938 B2 | 5/2006 | Sundqvist et al. |
| 7,233,933 B2 | 6/2007 | Horvitz et al. |
| 7,289,619 B2 | 10/2007 | Vivadelli et al. |

(Continued)

FOREIGN PATENT DOCUMENTS

| WO | 2015017664 A2 | 2/2015 |
| WO | 2018236862 A1 | 12/2018 |

OTHER PUBLICATIONS

Sood T, Janssen P and Miller C; "Spacematch: Using Environmental Preferences to Match Occupants to Suitable Activity-Based Workspaces", 2020, Front. Built Environ. vol. 6:113 (Year: 2020).*

(Continued)

*Primary Examiner* — Jeff Zimmerman
*Assistant Examiner* — Wayne S. Murray
(74) *Attorney, Agent, or Firm* — Young Basile Hanlon & MacFarlane, P.C.

(57) ABSTRACT

A recommended workspace at a premises is determined for a user of a software platform requesting a workspace reservation based on learned preferences specific to the user. The workspace reservation request is initiated via an interaction by the user with one or more graphical user interfaces displaying information associated with workspaces at the premises. Scores for each of multiple candidate workspaces identified for the user from amongst available ones of the workspaces are determined based on weights defined according to learned personnel preferences of the user and learned workspace preferences of the user. A recommended workspace is determined for the user as a candidate workspace of the multiple candidate workspaces corresponding to a highest one of the scores. An indication of the recommended workspace is then output for display within the one or more graphical user interfaces in response to the workspace reservation request.

20 Claims, 8 Drawing Sheets

(56) References Cited

U.S. PATENT DOCUMENTS

| | | | |
|---|---|---|---|
| 8,644,473 B1 | 2/2014 | Bardwell et al. |
| 8,718,619 B2 | 5/2014 | Lidstrom et al. |
| 9,300,925 B1 | 3/2016 | Zhang |
| 9,495,465 B2 | 11/2016 | Bowers et al. |
| 9,639,875 B1 | 5/2017 | Elliott et al. |
| 9,697,046 B2 | 7/2017 | Moroski et al. |
| 9,734,511 B2 | 8/2017 | Wood |
| 9,781,176 B2 | 10/2017 | Xin et al. |
| 10,062,045 B2 | 8/2018 | Brown |
| 10,075,387 B1 | 9/2018 | Avasol |
| 10,083,490 B2 | 9/2018 | Williams, II et al. |
| 10,091,329 B2 | 10/2018 | Kuo et al. |
| 10,181,139 B2 | 1/2019 | Glass et al. |
| 10,289,966 B2 | 5/2019 | Daher et al. |
| 10,296,851 B2 | 5/2019 | Klein et al. |
| 10,477,396 B2 | 11/2019 | Schultz et al. |
| 10,554,725 B2 | 2/2020 | Kumar |
| 10,600,013 B2 | 3/2020 | Koppel et al. |
| 10,860,954 B1 | 12/2020 | Yeluguri et al. |
| 10,882,185 B2 | 1/2021 | Vu et al. |
| 10,998,970 B1 | 5/2021 | Passe |
| 11,004,161 B2 | 5/2021 | Nishida |
| 11,583,457 B2 | 2/2023 | Burton et al. |
| 11,909,662 B2 | 2/2024 | Lee et al. |
| 2002/0188489 A1* | 12/2002 | Cheng ............ G06Q 10/06316 705/7.42 |
| 2004/0003042 A1 | 1/2004 | Horvitz et al. |
| 2005/0193023 A1 | 9/2005 | Ismail |
| 2006/0224427 A1 | 10/2006 | Salmon |
| 2008/0059254 A1 | 3/2008 | Vivadelli et al. |
| 2012/0054355 A1 | 3/2012 | Arrasvuori et al. |
| 2013/0311925 A1 | 11/2013 | Denker et al. |
| 2014/0278594 A1 | 9/2014 | Vivadelli et al. |
| 2015/0039357 A1 | 2/2015 | Segal et al. |
| 2015/0112738 A1 | 4/2015 | Marinaro et al. |
| 2016/0267402 A1 | 9/2016 | Szabo |
| 2016/0300160 A1 | 10/2016 | Klein et al. |
| 2017/0026806 A1 | 1/2017 | Jampani et al. |
| 2017/0255880 A1* | 9/2017 | Daher ................ H04N 7/183 |
| 2017/0286853 A1 | 10/2017 | Liensberger et al. |
| 2017/0316383 A1 | 11/2017 | Naganathan et al. |
| 2017/0331770 A1 | 11/2017 | Griffin et al. |
| 2017/0357917 A1 | 12/2017 | Holmes et al. |
| 2018/0267594 A1 | 9/2018 | Meier et al. |
| 2018/0285777 A1 | 10/2018 | Li et al. |
| 2018/0308029 A1* | 10/2018 | Löffler .................. H04W 4/12 |
| 2019/0012614 A1 | 1/2019 | Yamada et al. |
| 2019/0213465 A1 | 7/2019 | Avrahami et al. |
| 2019/0228348 A1 | 7/2019 | O'Keefe-Sally et al. |
| 2019/0228350 A1 | 7/2019 | Klein et al. |
| 2019/0260590 A1 | 8/2019 | Kuenzi |
| 2019/0306267 A1 | 10/2019 | Lee et al. |
| 2019/0311303 A1 | 10/2019 | Kanteti et al. |
| 2020/0096346 A1 | 3/2020 | Dhandapani et al. |
| 2020/0118045 A1 | 4/2020 | Chung et al. |
| 2020/0174825 A1 | 6/2020 | Hayashi |
| 2020/0218324 A1* | 7/2020 | Decamp ................ G06F 1/329 |
| 2020/0302344 A1* | 9/2020 | Just ..................... G06F 21/34 |
| 2020/0305160 A1 | 9/2020 | Zeng |
| 2020/0311619 A1 | 10/2020 | Ramirez Flores et al. |
| 2020/0311635 A1 | 10/2020 | Emig et al. |
| 2020/0312120 A1 | 10/2020 | VanBlon et al. |
| 2020/0410407 A1 | 12/2020 | Hashimoto |
| 2021/0065069 A1* | 3/2021 | Yeluguri ................ G06Q 10/02 |
| 2021/0150423 A1 | 5/2021 | Tomosugi et al. |
| 2021/0233035 A1 | 7/2021 | Lee et al. |
| 2021/0350333 A1 | 11/2021 | Hashimoto |
| 2021/0357878 A1 | 11/2021 | Suzuki |
| 2021/0392550 A1 | 12/2021 | Saito |
| 2022/0053036 A1* | 2/2022 | Vashisht ............... H04L 65/403 |
| 2022/0239639 A1 | 7/2022 | Jasleen et al. |
| 2022/0327438 A1 | 10/2022 | Bach et al. |
| 2022/0350770 A1 | 11/2022 | Bach et al. |
| 2023/0049989 A1* | 2/2023 | Franc De Ferriere . G06Q 10/02 |
| 2023/0050116 A1 | 2/2023 | Franc De Ferriere et al. |
| 2023/0236632 A1 | 7/2023 | Lukanc et al. |

OTHER PUBLICATIONS

International Search Report and Written Opinion mailed on Oct. 18, 2022 in corresponding PCT Application No. PCT/US2022/038490.
International Search Report and Written Opinion mailed on Nov. 4, 2022 in corresponding PCT Application No. PCT/US2022/038493.
International Search Report and Written Opinion mailed on Aug. 30, 2023 in corresponding PCT Application No. PCT/US2023/023544.
International Search Report and Written Opinion mailed on Jul. 31, 2023 in corresponding PCT Application No. PCT/US2023/019604.

* cited by examiner

MULTI-FACTOR AVAILABLE WORKSPACE RESERVATION RECOMMENDATION

FIELD

This disclosure generally relates to multi-factor available workspace reservation recommendation, and, more specifically, to evaluating available workspaces in connection with a workspace reservation request received for a software platform user based on learned personnel preferences and learned workspace preferences generated and updated using records of real-time communications involving the user across software services of the software platform.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
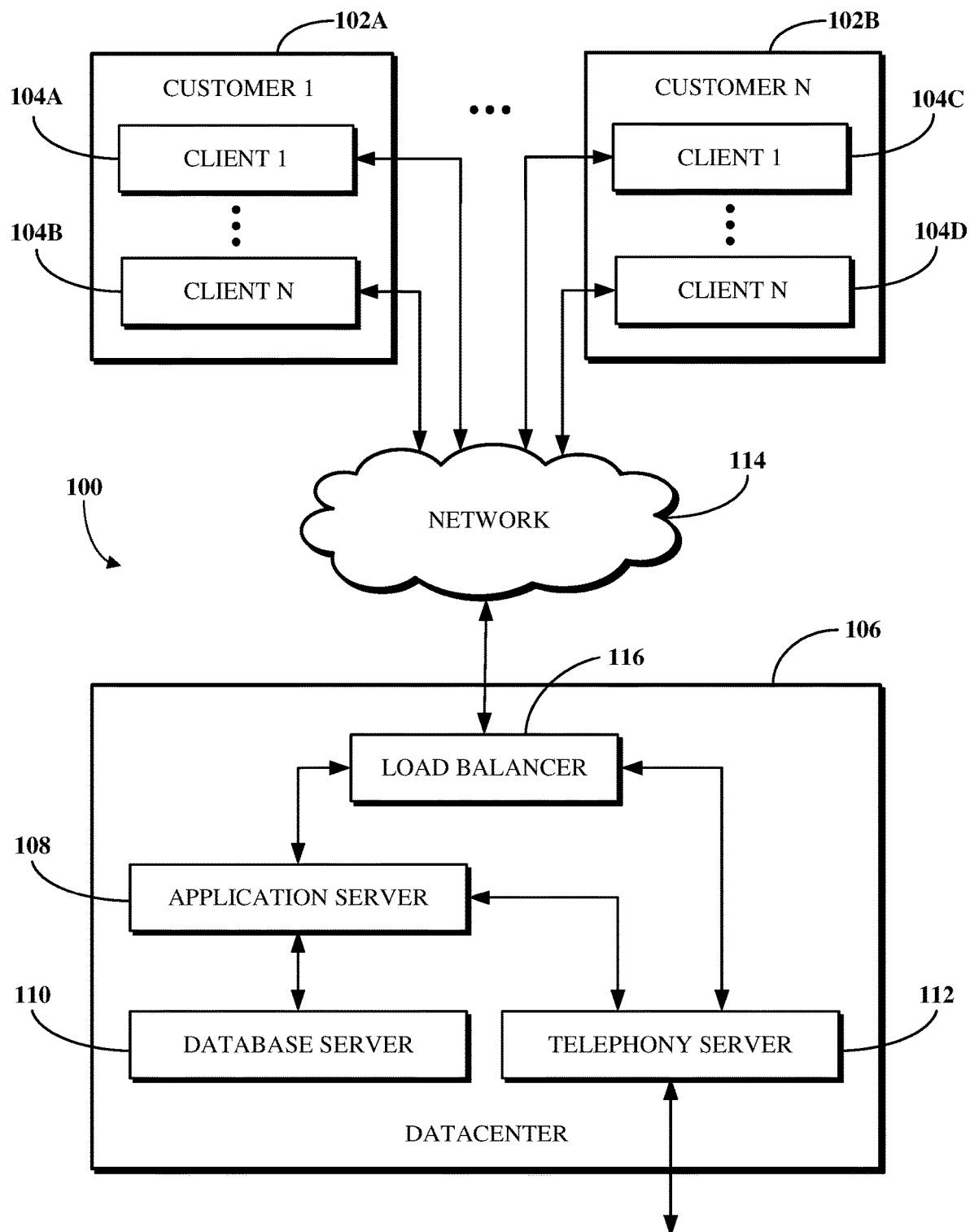
FIG. 1 is a block diagram of an example of an electronic computing and communications system.

The ubiquity of connected devices and increased availability of high network throughput has enabled workers in a variety of industries to work remotely from locations other than physical office spaces. In some cases, workers may have the option to exclusively work remotely, such as from their homes. In other cases, workers may be given flexibility to work remotely on some days and in a physical office space on others. As more workers move toward such hybrid work arrangements, fixed resource reservations, including but not limited to permanent workspace assignments and accompaniments (e.g., nameplates and information technology device assignments), may be less frequently used. However, when such hybrid workers are present in a physical office space, they will still need reliable access to workspaces such as desks, offices, conference rooms, and the like, and in some cases related resources such as phones and computer docking stations. It is therefore very important that office systems become more dynamic to enable workers to reserve workspaces for use (e.g., on an hourly or daily basis) while present at the office.

Conventional workspace reservation approaches involve a user interacting with a computing device to view some textual or illustrative information representing available and unavailable workspaces at an office. The user may manually review such information to decide on a workspace to select for their use. For example, because many users may prefer to sit nearby other people with whom they frequently work, a user of a conventional workspace reservation system may manually peruse textual or illustrative information to determine a location of a workspace that such another person has reserved. However, these conventional approaches suffer from drawbacks related principally to the complications in user experience and shortcomings in technical capability. In one example, it is generally challenging and highly time consuming for a user to identify locations of workspaces reserved by other people whom the user may want to be near. The user may have to needlessly browse through a list or map for an extended period of time to find such information, to the extent such information is even available to the user. In some cases, the user may simply give up on trying to find such a person, consequentially potentially impacting their work performance. In another example, these conventional approaches rely upon the user to manually identify all of the people the user wants to be near, and are therefore unable to determine when a better workspace option nearby a different person or multiple different people would be more optimal for the user.

Importantly, these conventional approaches do not use, evaluate, or perform any processing based on relationships between the user and other people and/or between the user and certain workspace types and thus are necessarily technically limited to manual user workspace selection without recommendations. For example, a workspace reservation approach that relies upon the user to manually review and manually evaluate workspace options does not learn preferences of the user or make recommendations for workspace selections for the user based on those preferences. In another example, such a workspace reservation approach does not provide a feedback mechanism for updating any such learned preferences based on whether the user ultimately selected a given workspace based on the learned preferences. In some cases, a workspace reservation approach may be implemented in connection with a software platform, such as a unified communications as a service (UCaaS) platform that provides various software services for enabling users to communicate in real-time or otherwise. The failure of such a software platform to learn actionable preferences of a user based on the content of such communications, when opted into by the participants to those communications, represents a material and technical shortcoming thereof.

Implementations of this disclosure address problems such as these by using technical improvements to conventional available workspace systems to learn personnel and workspace preferences specific to a user of a software platform and to recommend a workspace for the user based on a workspace reservation request received by or for the user. The workspace reservation request is initiated via an interaction by the user with one or more graphical user interfaces displaying information associated with workspaces at the premises. Scores for each of multiple candidate workspaces identified for the user from amongst available ones of the workspaces are determined based on weights defined according to learned personnel preferences of the user and learned workspace preferences of the user. A recommended workspace is determined for the user as a candidate workspace of the multiple candidate workspaces corresponding to a highest one of the scores. An indication of the recommended workspace is then output for display within the one or more graphical user interfaces in response to the workspace reservation request.

To describe some implementations in greater detail, reference is first made to examples of hardware and software structures used to implement a system for multi-factor available workspace reservation recommendation. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
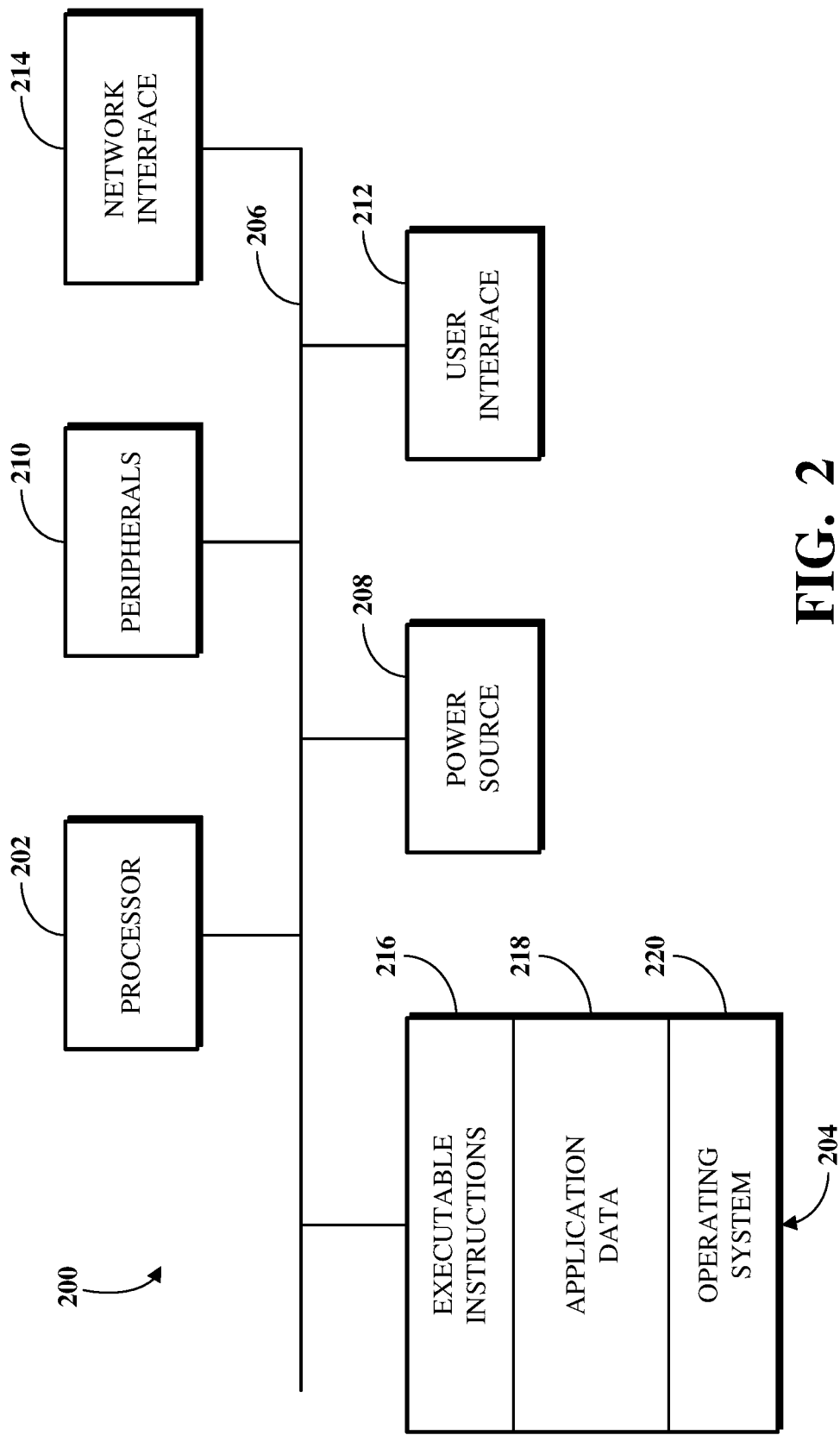
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
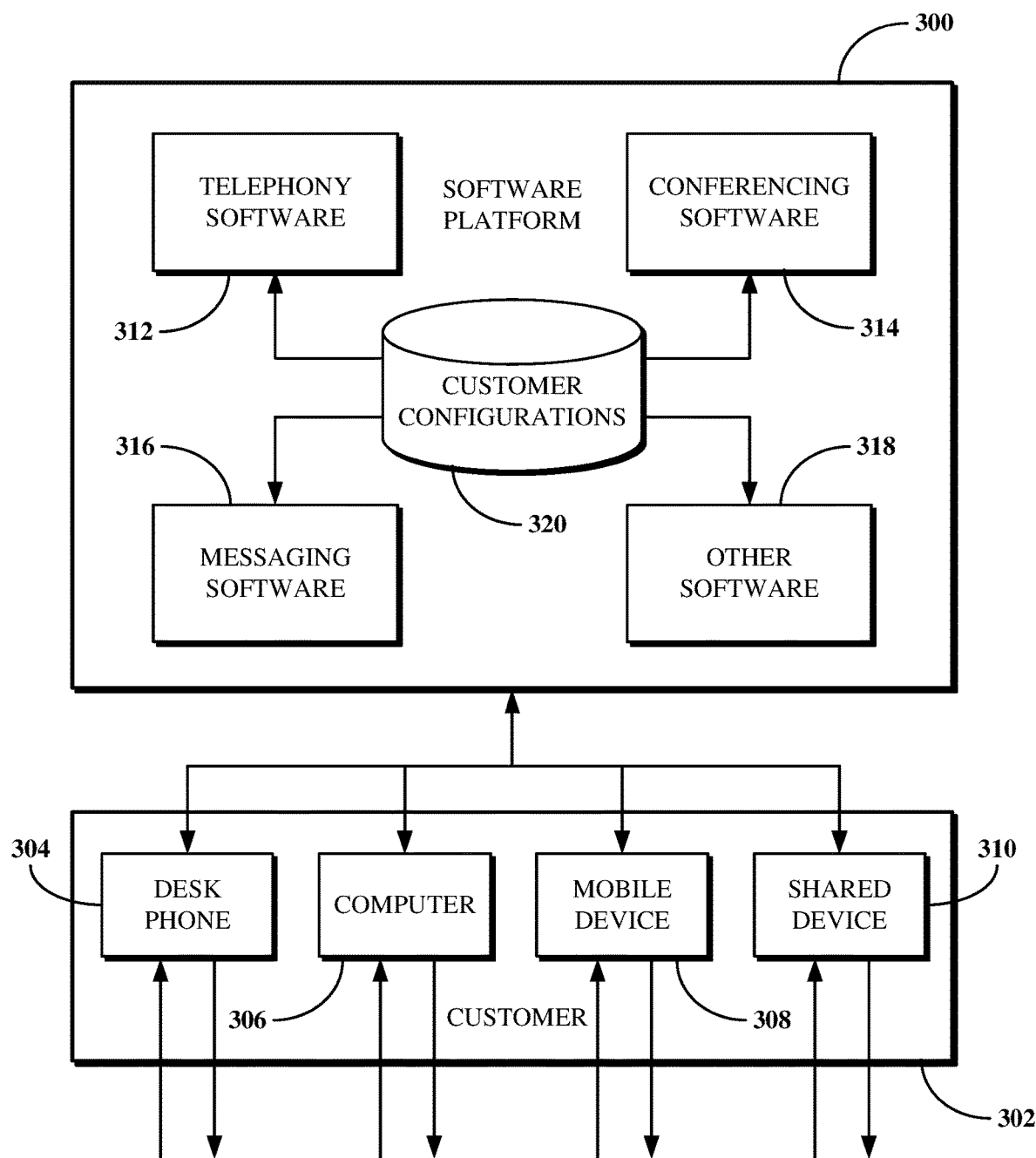
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include workspace reservation software, such as for multi-factor available workspace reservation recommendation.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
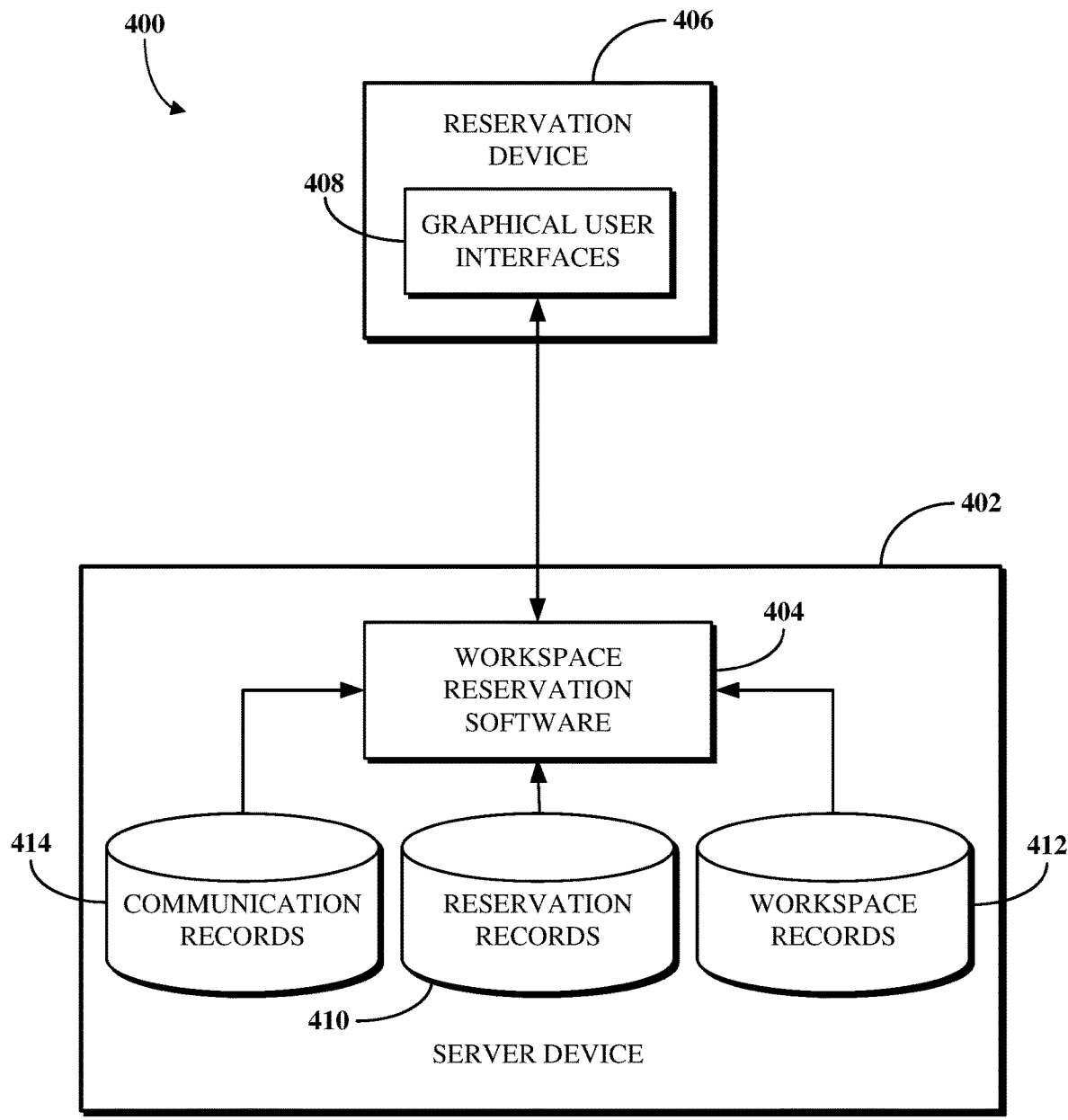
FIG. 4 is a block diagram of an example of a system for multi-factor available workspace reservation recommendation.

FIG. 4 is a block diagram of an example of a system 400 for multi-factor available workspace reservation recommendation. The system 400 includes a server device 402, which may, for example, be a server device used to implement some or all of a software platform, for example, the software platform 300 shown in FIG. 3. In particular, the server device 402 runs workspace reservation software 404 for facilitating reservations of workspaces by users of the software platform for use within a premises at which those workspaces are located. In particular, the workspace reservation software 404 is configured to evaluate available workspaces in connection with a workspace reservation request received for a software platform user based on learned personnel preferences and learned workspace preferences generated and updated using records of real-time communications involving the user across software services of the software platform. The workspace reservation software 404 may, for example, be the resource reservation software described above with respect to the other software 318 shown in FIG. 3. A premises within which a reservable workspace is located may, for example, refer to an office spanning one or more rooms of a suite, one or more suites on a floor of a building, one or more floors of a building, and/or one or more buildings.

As shown, the workspace reservation software 404 interacts with a reservation device 406. The reservation device 406 is a computing device usable by a user to reserve a workspace. For example, the reservation device 406 may be a personal device, such as a tablet computer or smartphone. In another example, the reservation device 406 may be a shared device, such as a digital signage device (e.g., a kiosk or other device located in a lobby of a premises). Although a single reservation device 406 is shown, in some implementations, multiple reservation devices including the reservation device 406 may interact with the workspace reservation software 404 at a given time, such as to allow the simultaneous reservation of workspaces by or otherwise for multiple users.

The reservation device 406 outputs for display one or more graphical user interfaces 408 associated with the workspace reservation software 404. The one or more graphical user interfaces 408 are configured to visually output information associated with workspaces which are available for reservation and/or which are unavailable for reservation (e.g., because they are under an active reservation by another user). A user of the reservation device 406 may navigate through the one or more graphical user interfaces 408 as part of a workspace reservation process. For example, a first graphical user interface of the graphical user interfaces 408 may prompt a user to input information about themselves and/or the purpose of their visit to the premises for reserving a workspace. In another example, a second graphical user interface of the graphical user interfaces 408 may present, in either an illustrative map or text-based list view, information associated with workspaces at the premises. The second graphical user interface may, in particular, display a recommended workspace determined by the workspace reservation software 404 for selection by the user. In yet another example, a third graphical user interface of the graphical user interfaces 408 may indicate, based on (e.g., in response to) a selection of the recommended workspace or another workspace by the user, directions for locating the workspace selected by the user. In some implementations, a single graphical user interface 408 may statically remain output to the display of the reservation device 406 and partially or wholly cycle through portions of the information described above.

The reservation device 406 may connect to the server device 402 to access the workspace reservation software 404 over a network, for example, the network 114 shown in FIG. 1. As such, in at least some cases, information to be rendered within the one or more graphical user interfaces 408 may be received at the reservation device 406 via the network. In some implementations, where the server device 402 is a local computing device located at the premises (e.g., a local node) rather than in an external location such as a datacenter, the network connecting the server device 402 and the reservation device 406 may be a public or private local network configured for use by the server device 402 and the reservation device 406.

The workspace reservation software 404 processes reservations of workspaces for users within the premises, including by performing a multi-factor available workspace reservation recommendation process for determining a recommended workspace for a given user based on learned personnel preferences and learned workspace preferences specific to that user. Generally, the learned personnel preferences refer to preferences learned for a user as to the specific people or types of people that the user prefers to be near while at the premises, and the learned workspace preferences refer to preferences learned for a user as to the specific workspaces or types of workspaces that the user prefers to use while at the premises. The learned personnel preferences and the learned workspace preferences are determined over time by the workspace reservation software 404 based on one or both of information input to the workspace reservation software 404 or a related software aspect by or for the subject user or historical information associated with past reservations of workspaces by or for the subject user using the workspace reservation software 404. The workspace reservation software 404 may use one or more learning models trained based on software platform data to determine the learned personnel preferences and/or the learned workspace preferences for one or more software platform users. For example, such a learning model may be one or more of a neural network (e.g., a convolutional neural network, recurrent neural network, or other neural network), decision tree, vector machine, Bayesian network, genetic algorithm, deep learning system separate from a neural network, or other machine learning model.

The workspace reservation software 404 determines the learned personnel preferences and the learned workspace preferences for a user based on records stored within one or more data stores, including a reservation records data store 410, a workspace records data store 412, and a communication records data store 414. Records stored within the data stores 410 through 414 may be all of the same type or format or may be of different types and/or formats. For example, the data stores 410 through 414 may in some cases all store the records thereof in a table format. In another example, one of the data stores 410 through 414 may store records thereof in a table format while another of the data stores 410 through 414 may store records thereof in a comma separated value format. As shown, the data stores 410 through 414 are located at the server 402. However, in some implementations, one or more of the data stores 410 through 414 may be located other than at the server 402, provided such other location is accessible to the workspace reservation software 404.

The reservation records data store 410 stores records associated with past reservations by or for users of workspaces within a premises. For example, a record stored within the reservation records data store 410 may correspond to a single workspace reservation for a single user and indicate information including one or more of a name or other identifier of the user, a name or other identifier of the reserved workspace, a date and time at which the reservation was made, a period of time during which the workspace remained active (e.g., the length of the reservation or a shorter term if the reservation was prematurely terminated by or for the user), whether or not the reserved workspace was a recommended workspace determined by the workspace reservation software 404, or learned personnel and/or workspace preferences used by the workspace reservation software 404 to determine the reserved workspace where the reserved workspace was a recommended workspace.

The workspace records data store 412 stores records associated with workspaces which are generally capable of being reserved by or for users at the premises. For example, a record stored within the workspace records data store 412 may correspond to a single workspace and indicate information including one or more of a name or identifier of the workspace, a location of the workspace (e.g., based on manually-derived or machine learning-derived labels for locations within a premises, such as different floors, suites, rooms, or other areas), resources available for use at the workspace (e.g., phones, computing devices, doors, or windows), a number of people capable of concurrently using the workspace (e.g., one for a desk or some number of multiple people for a conference room), a number of times the workspace has been reserved (e.g., in sum or over some period of time), or a total amount of time during which reservations have been active for the workspace (e.g., in sum or over some period of time).

The communication records data store 414 stores records associated with real-time communications and/or non-real-time communications between users of the software platform over software services of the software platform. The software services may, for example, include or otherwise refer to telephony services, conferencing services, chat services, messaging services, or email services. For example, a record stored within the communication records data store 414 may correspond to a single communication between two or more users and indicate information including one or more of names or other identifiers of the subject users, a type of the communication (e.g., video conference, phone call, or chat message), a date and time at which the communication was initiated (e.g., by the video conference starting or by a first chat message in the conversation being received), content of the communication (e.g., some or all of the chat messages or emails or some or all of a conference or telephone transcript), or metadata associated with the communication (e.g., emojis selected by one or more of the users, manually-derived or machine learning-derived category or conversational labels for the communication, or priority status designations).

The workspace reservation software 404 evaluates the information stored within the records of the data stores 410 through 414 to determine a recommended workspace for a user of the software platform. In particular, and as will be further described below with respect to FIG. 5, the workspace reservation software 404 determines scores for multiple candidate workspaces based on a workspace reservation request initiated by a user of the software platform. The scores are determined based on information specific to the user, including learned personnel preferences and learned workspace preferences determined based on records stored within the reservation records data store 410, the workspace records data store 412, and the communication records data store 414. One or more records within the reservation records data store 410 may be accessed to determine other users who have active reservations at certain workspaces in the premises. One or more records within the workspace records data store 412 may be accessed to determine workspaces available at the premises that correspond to learned workspace preferences of the subject user who initiated the workspace reservation request. One or more records within the communication records data store 414 may be accessed to determine which of the other users who have active workspace reservations have relationships with the subject user.

The workspace reservation software 404 may identify some or all of the available workspaces as the multiple candidate workspaces. The workspace reservation software 404 may then determine the scores for the multiple candidate workspaces by determining the learned personnel and workspace preferences of the user based on the records accessed from within the data stores 410 through 414. In some implementations, the workspace reservation software 404 may determine the learned personnel and workspace preferences and/or the scores based thereon using a machine learning model trained to infer user personnel and workspace preferences. In some such implementations, the machine learning model may use contextual processing to evaluate records stored within the communication records data store 414 to determine which other users with active reservations have relationships with the subject user. In some such implementations, the machine learning model may extrapolate upon past workspace reservations for a subject user to infer workspace preferences based on configurations of the workspaces associated with the past workspace reservations. In some such implementations, the machine learning model may model combinations of personnel and workspace preferences to determine which combinations thereof are desirable to users, in connection with the determination of scores for multiple candidate workspaces.

In some implementations, the system 400 may include a user preferences data store (not shown) stored at or otherwise accessible by the server 402 for use with the workspace reservation software 404. For example, the user preferences data store may store records generated by the workspace reservation software 404 indicating learned personnel preferences and learned workspace preferences for subject users. The workspace reservation software 404 may thus use a record stored in the user preferences data store to determine the learned personnel preferences and the learned workspace preferences at a time of a workspace reservation request instead of separately evaluating records of the reservation records data store 410, the workspace records data store 412, and/or the communication records data store 414. In some such implementations, a record of the user preferences data store may be generated for a user in connection with a first workspace reservation by or for the user and thereafter updated in connection with a later, second workspace reservation by or for the user.

In some implementations, use of a reserved workspace by the subject user may be verified during a period of the reservation (e.g., while the reservation is active), and output of the verification can be used to update one or both of the learned personnel preferences or the learned workspace preferences for the user. For example, in some cases, a user may complete a reservation for a workspace and end up not using it, such as because they accidentally went to a different workspace, intentionally decided to sit at a different workspace, or decided to leave the premises at which the workspace is located without first visiting the workspace. In such a case, information indicative of the reservation of that workspace by that user may not be valuable to influence future workspace recommendations given that the user did not actually make use of the workspace. In some such implementations, use of the reserved workspace by the user can be verified using one or more sensors included in or within a range (e.g., cone or field of view) of the reserved workspace. For example, the one or more sensors can include cameras, motion sensors, or magnetic (e.g., open/close) sensors. In some such implementations, use of the reserved workspace by the user can be verified using software running at a computing device or other resource (e.g., desk phone) provisioned for use at the workspace. For example, software can communicate the use of such a device or other resource, thereby indicating use of the workspace. In some such implementations, use of the reserved workspace by the user can be verified using a monitoring device configured to monitor use of the reserved workspace. For example, a keycard machine or other device with which the user may interact to use the workspace can verify workspace usage based on such an interaction by the user.

The following example use case is provided to illustrate an example situation by which the system 400 may be used to process a workspace reservation request for a user. A user named Alice enters a premises and approaches a digital signage device in the lobby to initiate a workspace reservation request. The digital signage device runs or otherwise accesses software (e.g., the workspace reservation software 404) that outputs one or more graphical user interfaces showing a map of the premises in which workspaces located at the premises are visually distinguished by color or shading as being available or unavailable for reservation. Alice interacts with a "Recommend a workspace" user interface element on the one or more graphical user interfaces to cause the software to begin the workspace recommendation determination process. The software accesses one or more data stores (e.g., the data stores 410 through 414) in response to Alice's interaction with the user interface element to identify multiple candidate workspaces within the premises and to determine scores for each of those candidate workspaces according to the records accessed within the one or more data stores. Based on the records, the software determines that Alice frequently interacts with other users named Bob, Caroline, and Daniel, and that Alice historically reserves workspaces that are nearby windows and are provisioned with desk phones. The software evaluates each of the multiple candidate workspaces to determine the scores based on how well each of the individual candidate workspaces corresponds to these learned preferences of Alice. For example, the software may determine a highest score for a first candidate workspace that is next to a window and a workspace actively reserved by or for Daniel and that has a desk phone provisioned at it, a next highest score for a second candidate workspace that is two workspaces away from a workspace actively reserved by or for Caroline and has a desk phone provisioned at it (but which is not nearby a window), a lower score for a third candidate workspace that is next to a workspace actively reserved by or for Bob but which has neither a window nearby it nor a desk phone provisioned at it, and a lowest score for a fourth candidate workspace that is not nearby Bob, Caroline, Daniel, or a window but has a desk phone provisioned at it. In this example, the learned personnel preferences have been more heavily weighted than the learned workspace preferences. In other examples, the learned workspace preferences may be weighted more heavily than the learned personnel preferences, or the learned workspace preferences and the learned personnel preferences may be identically weighted. The software accordingly outputs, based on the scores, an indication of the first candidate workspace as the recommended workspace at the one or more graphical user interfaces. Alice reviews the indication and decides to select the recommended workspace. An active workspace reservation is accordingly placed for Alice at the recommended workspace, and Alice proceeds to begin her workday at that workspace.

Figure 5:
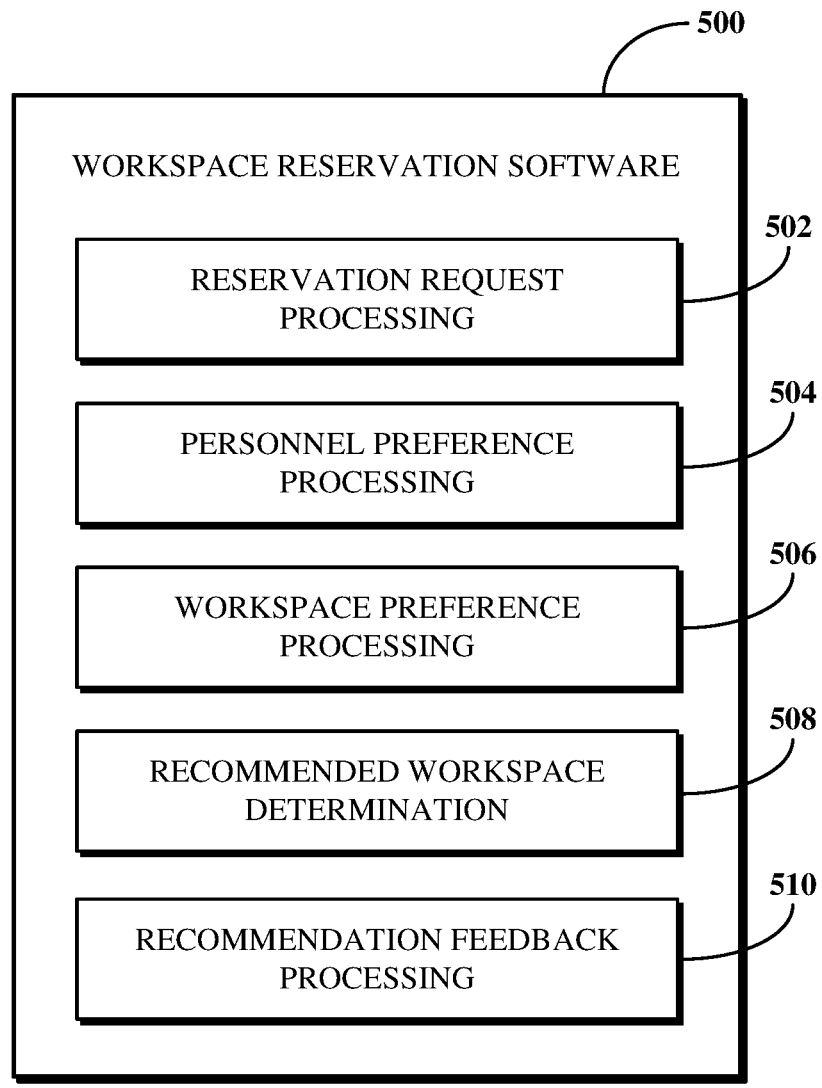
FIG. 5 is a block diagram of example functionality of workspace recommendation software.

FIG. 5 is a block diagram of example functionality of workspace recommendation software 500, which may, for example, be the workspace recommendation software 404 shown in FIG. 4. The workspace recommendation software 500 includes tools, such as programs, subprograms, functions, routines, subroutines, operations, and/or the like for evaluating available workspaces in connection with a workspace reservation request received for a software platform user based on learned personnel preferences and learned workspace preferences generated and updated using records of real-time communications involving the user across software services of the software platform. As shown, the workspace recommendation software 500 includes a reservation request processing tool 502, a personnel preference processing tool 504, a workspace preference processing tool 506, a recommended workspace determination tool 508, and a recommendation feedback processing tool 510.

The reservation request processing tool 502 processes requests for workspace reservations for a user. The reservation request processing tool 502 may render one or more graphical user interfaces at a reservation device to initiate a workspace reservation process, such as by facilitating the receipt of a request for a workspace reservation from a user and outputting information associated with the request. For example, the reservation request processing tool 502 may initiate a workspace reservation process by facilitating the intake of input from one or more forms output within a graphical user interface. In another example, the reservation request processing tool 502 may initiate a workspace reservation request based on instructions communicated from an external application, website, or other source in response to the scanning of a QR code or like code. The reservation request processing tool 502 is configured to identify the user based on the request, for example, by accessing one or more software platform records associated with the user based on information associated with the request. For example, the user may be identified based on a name input within a form in a graphical user interface. In another example, the user may be identified based on an identifier associated with a device at which a QR code or like code was scanned.

The personnel preference processing tool 504 determines learned personnel preferences for the user. Determining the learned personnel preferences for the user includes determining persons or types of persons within whom the user has a relationship, in which relationships may be of varying ranks. Non-limiting examples of such varying ranks will now be described. A highest ranking of relationship may correspond to persons included in a favorites contact list of the user (e.g., persons who are starred or otherwise flagged as being important contacts). A second highest ranking of relationship may correspond to persons who the user frequently interacts with. Examples of frequent interactions which may be evaluated include interactions over a chat or messaging software service of the software platform, interactions over a conferencing software service of the software platform, interactions across multiple channels, and/or interactions based on one or more previous workspace reservations. A third highest ranking of relationship may correspond to persons on a same team or in a same department as the user. A fourth highest ranking of relationship may correspond to persons with whom the person has had at least one interaction via at least one software service of the software platform.

The personnel preference processing tool 504 may determine the persons or types of persons with whom the user has a relationship using data stored in a communication records data store or a reservation records data store, for example, the data stores 414 and 410 shown in FIG. 4, respectively. For example, the personnel preference processing tool 504 may track records of real-time communications and non-real-time communications between users of software services of the software platform over time to generate and update records indicative of relationships between a given user and other persons. In some cases, the personnel preference processing tool 504 may update the learned personnel preferences for a user on a periodic or otherwise discrete time interval basis, such as once per hour or per day. In some cases, the personnel preference processing tool 504 may update the learned personnel preferences for a user on an event basis, such as based on new records being available for access by the personnel preference processing tool 504. In some implementations, the learned personnel preferences may be determined by the personnel preference processing tool 504 using a learning model. For example, the personnel preference processing tool 504 may use a learning model trained to recognize relationship patterns between users of a software platform and other people to inference against one or more records of the software platform to determine the learned personnel preferences for a user.

In some implementations, the personnel preference processing tool 504 may be configured to determine relationships between a user of a software platform and another person who is not also a user of the software platform. For example, in some cases, the premises at which the workspaces are located may be shared between users of the software platform and non-users of the software platform (e.g., a coworking space used by multiple businesses or other groups). In some such implementations, the personnel preference processing tool 504 may determine relationships between a user of the software platform and one or more non-users of the software platform based on one or more of input from the user identifying such a non-user, feedback from a past workspace reservation indicating that a user enjoyed sitting at a workspace nearby (e.g., next to or within some defined or specified range) such a non-user, communications between the user and a known account of the non-user (e.g., emails in which an email address of the non-user is known to or otherwise accessible by the personnel preference processing tool 504, such as based on past workspace reservation data), or sensor data indicating a frequency or multiplicity of communications between the user and the non-user during a past workspace reservation of the user.

The workspace preference processing tool 506 determines learned workspace preferences for the user. Determining the learned workspace preferences for the user includes determining workspaces or types of workspaces that the user prefers based on various characteristics of workspaces, in which characteristics and combinations thereof may be of varying ranks. Non-limiting examples of such varying ranks will now be described. A highest ranking of workspace may correspond to a workspace most recently reserved by or for the user (i.e., the workspace the user used when they last were at the premises). A second highest ranking of workspace may correspond to other workspaces the user has reserved in the past, for example, frequently reserved workspaces. A third highest ranking of workspace may correspond to workspaces within a same or similar location as workspaces that the user has reserved in the past. A fourth highest ranking of workspace may correspond to workspaces that have the same or similar resource configurations (e.g., doors, phones, or computer docking stations) as workspaces that the user has reserved in the past.

The workspace preference processing tool 506 may determine the workspaces or types of workspaces the user prefers using data stored in a workspace records data store or a reservation records data store, for example, the data stores 412 and 410 shown in FIG. 4, respectively. For example, the workspace preference processing tool 506 may track records of workspaces reserved by or for the user over time to generate and update records indicative of workspace preferences for the user. In some cases, the workspace preference processing tool 506 may update the learned workspace preferences for a user on a periodic or otherwise discrete time interval basis, such as once per hour or per day. In some cases, the workspace preference processing tool 506 may update the learned workspace preferences for a user on an event basis, such as based on new records being available for access by the workspace preference processing tool 506. In some implementations, the learned workspace preferences may be determined by the workspace preference processing tool 506 using a learning model. For example, the workspace preference processing tool 506 may use a learning model trained to recognize workspace preference patterns of users of a software platform to inference against one or more records of the software platform to determine the learned workspace preferences for a user.

The recommended workspace determination tool 508 determines, based on the learned personnel preferences determined by the personnel preference processing tool 504 and the learned workspace preferences determined by the workspace preference processing tool 506, scores for multiple candidate workspaces identified from amongst available workspaces at a premises and determines a recommended workspace for the user as a candidate workspace of the multiple candidate workspaces corresponding to a highest one of the scores. The recommended workspace determination tool 508 then outputs, via one or more graphical user interfaces displayed at the reservation device used by the user to facilitate the workspace reservation, an indication of the recommended workspace for selection by the user. The user may accept the recommended workspace to reserve it or decline the recommended workspace to select a different workspace to reserve instead.

First, the multiple candidate workspaces are identified. The multiple candidate workspaces are workspaces identified as being available for reservation by the user of the software platform when the workspace reservation request is received from the user. In some cases, all such available workspaces may be included in the multiple candidate workspaces. In some cases, one or more filters may be used to pre-process the available workspaces which should be included in the multiple candidate workspaces. For example, a filter usable to pre-process the available workspaces may remove from consideration one or more workspaces designated as a high priority workspace available for software platform users in a priority user category (e.g., very important persons (VIPs)), such as corner offices or offices over a threshold area size. In another example, a filter usable to pre-process the available workspaces may remove from consideration one or more workspaces being temporarily held for another user, such as a workspace reserved by a same user at the same time each week. In yet another example, a filter usable to pre-process the available workspaces may remove from consideration one or more workspaces which are next to or nearby (e.g., within a threshold distance of) a person who the user has added to a blacklist or otherwise indicated a preference to not be seated near and/or which are workspaces or types of workspaces (e.g., having certain locations, configurations, and/or resources) that the user has added to a blacklist or otherwise indicated a preference not to be seated at.

Next, scores are determined for each of the multiple candidate workspaces. The scores are determined based on the learned personnel preferences and the learned workspace preferences. A base personnel score and a base workspace score may be given to each candidate workspace, and weights may be applied to one or both of those base scores based on criteria associated with the learned personnel preferences and/or the learned workspace preferences being met by a given candidate workspace. The weights are numerical values defined according to the rankings of relationships determined by the personnel preference processing tool 504 and preferences determined by the workspace preference processing tool 506. In particular, different weights may be applied based on different rankings met by a given candidate workspace. For example, personnel preferences associated with a highest rank, which indicate a strongest relationship to the user, may have a highest weight applied thereto, and personnel preferences associated with a lowest rank, which indicate a least strong relationship to the user, may have a lowest weight applied thereto. Similarly, workspace preferences associated with a highest rank, which indicate a strongest preference for a workspace, may have a highest weight applied thereto, and workspace preferences associated with a lowest rank, which indicate a least strong preference for a workspace, may have a lowest weight applied thereto.

Determining a score for a candidate workspace of the multiple candidate workspaces includes determining a personnel score based on the learned workspace preferences, determining a workspace score based on the learned workspace preferences, and combining the personnel score and the workspace score to determine a final score for the candidate workspace. To determine a personnel score for a candidate workspace, a determination is made as to whether a person represented by the learned personnel preferences is associated with a reserved workspace next to or nearby (e.g., within a threshold distance) the candidate workspace. If so, a personnel weight is determined based on a rank of a relationship between the user and such person, and the personnel weight is applied to the base personnel score to determine the personnel score for the candidate workspace. Where the candidate workspace is next to workspaces associated with multiple such people, the weights associated with a rank of relationship may be added together and then applied to the base personnel score, or each weight may be separately applied to the base personnel score and the resulting value combined, to determine the personnel score for the candidate workspace. If none of the workspaces next to or nearby the candidate workspace are associated with a person represented by the learned personnel preferences, no weight is applied to the base personnel score, and thus the base personnel score is used as the personnel score for the candidate workspace.

To determine a workspace score for a candidate workspace, a determination is made as to whether the candidate workspace has previously been reserved by or for the user and/or is in a same or similar location or has the same or similar resources as a workspace previously reserved by or for the user. If so, a workspace weight is determined based on a weight of a preference for the workspace, and the workspace weight is applied to the base workspace score to determine the workspace score for the candidate workspace. Where the candidate workspace has multiple of the workspace preferences (e.g., is in a same location and has same resource configurations as the workspace most recently reserved by or for the user), the weights associated with a rank of workspace preference may be added together and then applied to the base workspace score, or each weight may be separately applied to the base workspace score and the resulting value combined, to determine the workspace score for the candidate workspace. If the candidate workspace does not meet any of the workspace preferences, no weight is applied to the base workspace score, and thus the base workspace score is used as the workspace score for the candidate workspace.

The personnel score and the workspace score for the candidate workspace are then combined (e.g., added) to determine the final score, also simply referred to as the score, for the candidate workspace. Finally, the recommended workspace determination tool 508 determines the recommended workspace from amongst the multiple candidate workspaces based on the scores determined therefor. In particular, the candidate workspace of the multiple candidate workspaces corresponding to the highest score of the scores is determined as the recommended workspace for the user.

As described herein, the recommended workspace determination tool 508 determines a recommended workspace based on a workspace reservation request for a user. However, in some implementations, the recommended workspace determination tool 508 may determine a recommended workspace based on a predicted workspace reservation request. For example, the recommended workspace determination tool 508 may access one or more data stores of the software platform, such as the data stores 410 and 412, to determine a periodicity or other temporal pattern by which the user reserves workspaces (e.g., every Tuesday starting at 9 AM Eastern). The recommended workspace determination tool 508 may then predict that the user will initiate a workspace reservation process at 9 AM on the next Tuesday. Accordingly, at a time before 9 AM on that next Tuesday (e.g., one hour before or twelve hours before), the recommended workspace determination tool 508 can determine a recommended workspace for the user and transmit an indication of the recommended workspace to a device of the user (e.g., the reservation device, where the reservation device is a personal user device such as a smartphone or tablet computer rather than a shared device such as a digital signage display). For example, the indication of the recommended workspace can be transmitted to the device of the user as a push notification via a client application running at that device or as a text message. The user may respond to the push notification or text message to complete the workspace reservation process for the reservation of the recommended workspace or to decline the reservation of the recommended workspace.

In some implementations, the recommended workspace determination tool 508 may determine a recommended workspace for a user other than based on scores. For example, the recommended workspace determination tool 508 may perform a workflow for multi-factor available workspace reservation recommendation that sequentially evaluates workspaces according to learned personnel preferences and/or learned workspace preferences to determine a recommended workspace for the user. Implementations and examples for performing a workflow for multi-factor available workspace reservation recommendation that sequentially evaluates workspaces according to learned personnel preferences and/or learned workspace preferences are described below with respect to FIG. 7.

The recommendation feedback processing tool 510 processes feedback received directly or indirectly from the user for whom the recommended workspace determination tool 508 determined a recommended workspace to update one or more of the learned personnel preferences of the user or the learned workspace preferences of the user. In regard to updating the learned personnel preferences, the recommendation feedback processing tool 510 may receive feedback indicating whether or not the user prefers to be seated next to or otherwise nearby (e.g., within a specified or defined distance) a given other person and updates the learned personnel preferences accordingly. For example, the user may provide feedback indicating to add a given other person to a blacklist (i.e., a list of persons who the user does not want to be next to or nearby) or a whitelist (i.e., a list of persons who the user does want to be next to or nearby). The given other person is generally someone who has a reservation for a workspace next to or nearby the recommended workspace determined for the user by the recommended workspace determination tool 508.

In some implementations, the feedback used by the recommendation feedback processing tool 510 can be or derive from a response from the user to the recommended workspace determined by the recommended workspace determination tool 508. For example, where the user selects to reserve the recommended workspace (i.e., by accepting the recommended workspace), the recommendation feedback processing tool 510 can update the learned personnel preferences and/or the learned workspace preferences for the user by increasing one or more weights associated the recommended workspace, such as weights of the other persons next to or nearby that recommended workspace, the workspace itself, the location of the workspace, and the like. In another example, where the user selects to pursue a workspace other than the recommended workspace (i.e., by declining the recommended workspace), the recommendation feedback processing tool 510 can update the learned personnel preferences and/or the learned workspace preferences for the user by decreasing one or more weights associated the recommended workspace, such as weights of the other persons next to or nearby that recommended workspace, the workspace itself, the location of the workspace, and the like.

In some implementations, the recommendation feedback processing tool 510 can aggregate feedback and/or selections of workspaces by multiple users across multiple reservation sessions to update a learning model used to recommend a workspace based on a workspace reservation request. For example, a learning model used to determine learned workspace preferences can process data indicative of reservations of workspaces over time (e.g., based on records stored within the workspace records date store 412) to determine workspaces that are most frequently reserved. In some such implementations, such workspaces may be added to a highest rank of workspace preference for some or all users of the software platform. In some such implementations, a separate rank of workspace preference can be added for some or all users of the software platform to include these workspaces.

Although the tools 502 through 510 are shown as functionality of the workspace recommendation software 500 as a single piece of software, in some implementations, some or all of the tools 502 through 510 may exist outside of the workspace recommendation software 500 and/or the software platform may exclude the workspace recommendation software 500 while still including the some or all of tools 502 through 510 in some form elsewhere. For example, some or all of the tools 502 through 510 may be implemented by a client application running at a client device, for example, one of the client devices 304 through 310 shown in FIG. 3, or otherwise by software running at a reservation device (to the extent different from a client application running at a client device), for example, the reservation device 406 shown in FIG. 4.

Figure 6:
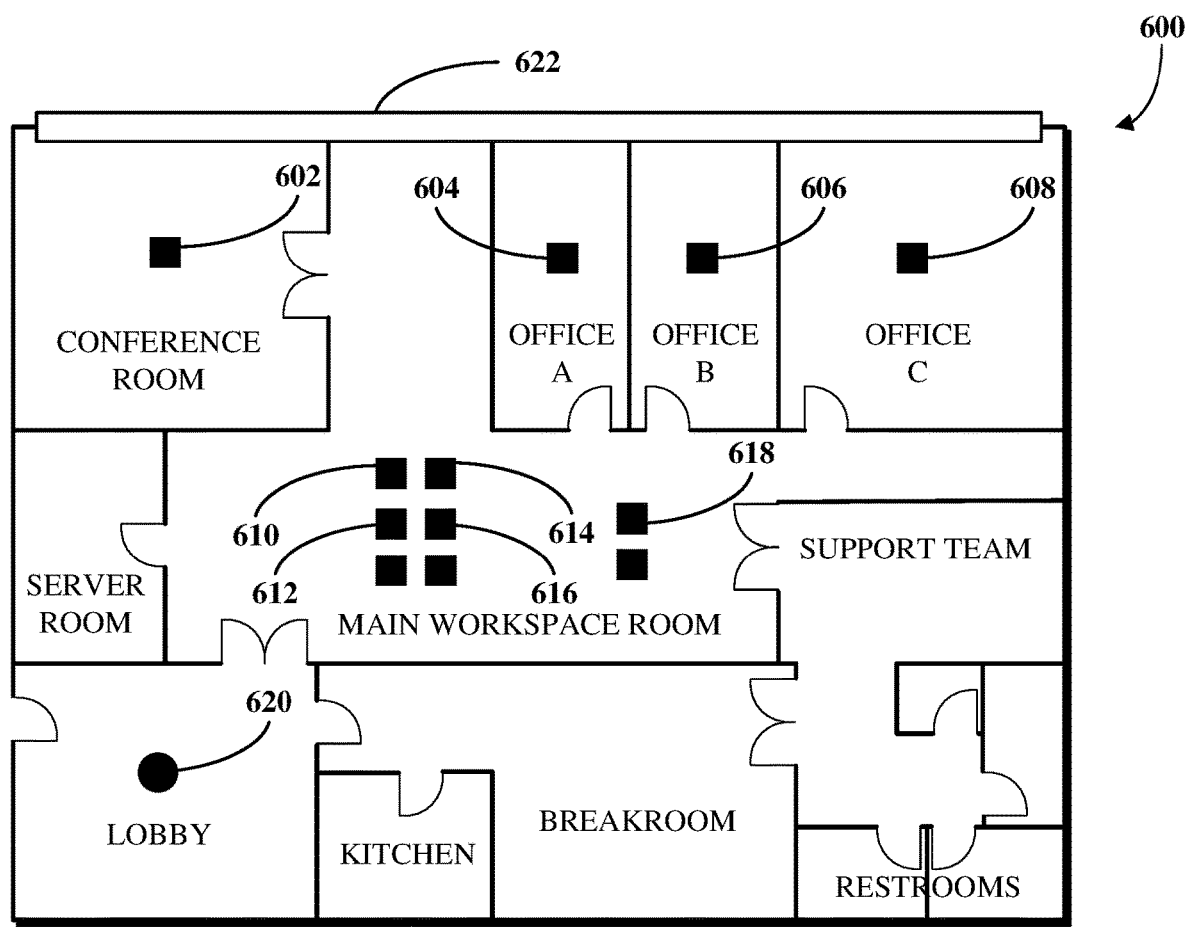
FIG. 6 is an illustration of an example of candidate workspaces for which scores may be determined at a premises.

FIG. 6 is an illustration of an example of candidate workspaces for which scores may be determined at a premises 600. In the illustration, example workspaces are shown as black squares. The example workspaces at the premises 600 include a conference room workspace 602, an Office A workspace 604, an Office B workspace 606, an Office C workspace 608, and main workspace room workspaces 610 through 618. A user enters the premises 600 and approaches a reservation device 620 in a lobby of the premises 600. The user identifies themselves to the reservation device 620, such as by entering their name within a graphical user interface output for display at the reservation device 620 or by scanning a code (e.g., a QR code) output at a display of a personal user device of the user.

Workspace reservation software at the reservation device 620 (e.g., the workspace reservation software 500 shown in FIG. 5) then presents information associated with the workspaces at the premises 600, such as in an illustrative (e.g., map) format or a textual (e.g., list) format. The workspace reservation software accesses one or more data stores to retrieve records indicative of learned personnel preferences and learned workspace preferences of the user. The workspace reservation software identifies workspaces available for reservation as candidate workspaces and determines scores for the candidate workspaces based on the learned personnel preferences and the learned workspace preferences.

In an example use case, learned personnel preferences for the user, Zach, indicate that one of Zach's favorite contacts is Yolanda, another person that Zach interacts with frequently via chat software of the software platform is Xavier, and a person on Zach's team is Wally. However, the learned personnel preferences also indicate that Zach prefers to not be seated next to or nearby Victor. The learned workspace preferences for Zach indicate that Zach most recently reserved the workspace 610 in the main workspace room, that Zach has previously reserved the Office A workspace 604, and that Zach prefers to reserve workspaces which are closest to windows. When Zach interacts with the reservation device 620 to initiate a workspace reservation process, the workspace reservation software at the reservation device 620 determines these preferences and determines scores for ones of the workspaces that are available based thereon. In this example, Yolanda has reserved the workspace 616 and Victor has reserved the Office B workspace 606. The workspace reservation software determines a highest score for the workspace 610 because it is Zach's most recently reserved workspace, it is next to (e.g., adjacent on a diagonal) or at least nearby the workspace 616 where Yolanda is located, and it is closest to a window 622. The workspace reservation software determines next highest scores for the workspaces 612 and 614 for similar reasons, with the scores being lower than that of the workspace 610 because the workspaces 612 and 614 are slightly farther from the window 622. The workspace reservation software determines a lower score for the conference room workspace 602 because it is not a workspace Zach has previously reserved and it is not next to or nearby Yolanda, but it is next to the window 622. The workspace reservation software determines lowest scores for the Office A workspace 604, the Office C workspace 608, and the workspace 618 because they are next to or otherwise nearby Victor. The workspace reservation software accordingly indicates the workspace 610 as the recommended workspace determined for Zach.

In another example use case involving the same people and preferences, Victor has reserved the workspace 610, Yolanda has reserved the workspace 612, Xavier has reserved the workspace 614, and Wally has reserved the workspace 616. A filter causes the Office C workspace 608 to be listed as unavailable awaiting reservation by a VIP and causes the conference room workspace 602 to be listed as unavailable awaiting reservation by multiple people. The workspace reservation software determines a highest score for the Office A workspace 604 because Zach has previously reserved it and it is next to the window 622. The workspace reservation software determines a next highest score for the Office B workspace 606 as it is in a location and has a configuration similar to the Office A workspace 604. The workspace reservation software determines a lowest score for the workspace 618 as it is not a workspace previously reserved by or for Zach, it is not next to a window, and it is not next to or nearby Yolanda, Xavier, or Wally. The workspace reservation software accordingly indicates the Office A workspace 604 as the recommended workspace determined for Zach.

Figure 7:
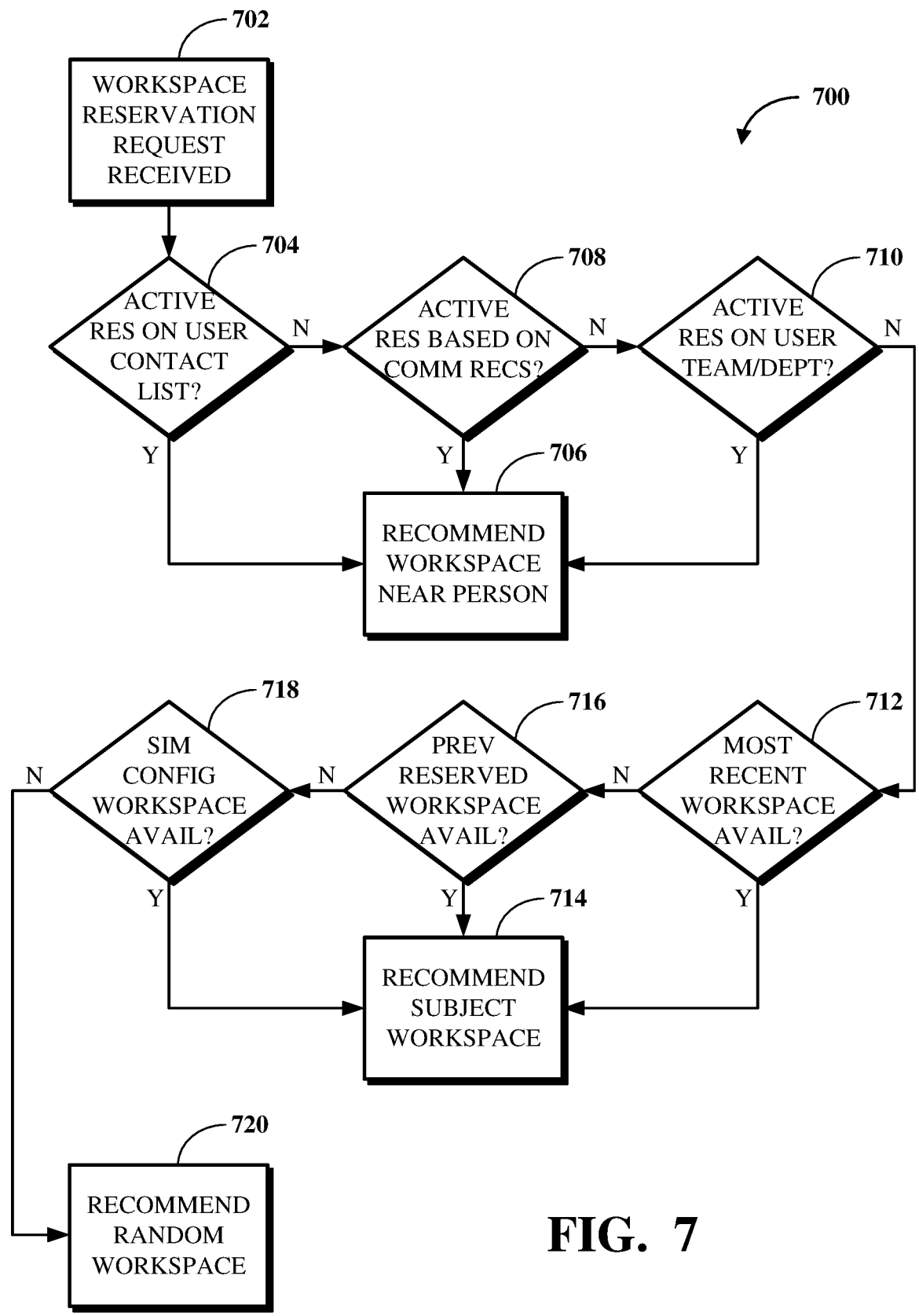
FIG. 7 is a block diagram of an example workflow for multi-factor available workspace reservation recommendation.

FIG. 7 is a block diagram of an example workflow 700 for multi-factor available workspace reservation recommendation. The workflow 700 represents one approach for determining a recommended workspace for a user in response to a workspace reservation request for the user. The workflow 700 in particular illustrates operations performed in connection with determining a recommended workspace separate from determining scores for candidate workspaces or otherwise identifying candidate workspaces for a subject user. For example, in some such cases, the operations of the workflow 700 may be sequentially addressed until a recommended workspace is determined thereby. In some implementations, multiple potential workspaces may be determined as the output from a given operation of the workflow 700. In some such implementations, and as will be noted below, the multiple potential workspaces may be evaluated using scores, for example, determined as discussed above with respect to FIGS. 4-6.

At 702, a workspace reservation request for a workspace at a premises is received from a user. At 704, the workflow 700 begins evaluating personnel preferences, in which a determination is made as to whether another person with an active workspace reservation at the premises is a favorite or otherwise prioritized contact on a contact list of the user. If so, at 706, a workspace next to or nearby (e.g., within a threshold distance) a workspace used by such another person is determined as the recommended workspace. If not, at 708, a determination is made as to whether another person with whom the user interacts with over one or more software services of the software platform (e.g., based on communication records of the software platform) has an active workspace reservation at the premises. If so, at 706, a workspace next to or nearby (e.g., within a threshold distance) a workspace used by such another person is determined as the recommended workspace. If not, at 710, a determination is made as to whether another person on a same team or in a same department as the user has an active workspace reservation at the premises. If so, at 706, a workspace next to or nearby (e.g., within a threshold distance) a workspace used by such another person is determined as the recommended workspace. If not, the workflow 700 begins evaluating workspace preferences.

At 712, a determination is made as to whether a workspace most recently reserved by or for the user is available. If so, at 714, the most recently reserved workspace is determined as the recommended workspace. If not, at 716, a determination is made as to whether a workspace previously reserved by or for the user is available. If so, at 714, such a previously reserved workspace is determined as the recommended workspace. If not, at 718, a determination is made as to whether a workspace at the same or a similar location as a previously reserved workspace of the user and/or a workspace with the same or similar resource configurations as a previously reserved workspace of the user is available. If so, at 714, such a workspace is determined as the recommended workspace. If not, at 720, a randomly selected workspace is determined as the recommended workspace.

In some implementations, workspaces associated with multiple persons may be determined at one or more of 704, 708, or 710. In some such implementations, each such workspace may be identified as a candidate workspace and scores can be determined for each of the candidate workspaces as described above with respect to FIGS. 4-6. In some implementations, multiple workspaces may be determined at one or both of 716 or 718. In some such implementations, each such workspace may be identified as a candidate workspace and scores can be determined for each of the candidate workspaces as described above with respect to FIGS. 4-6.

Figure 8:
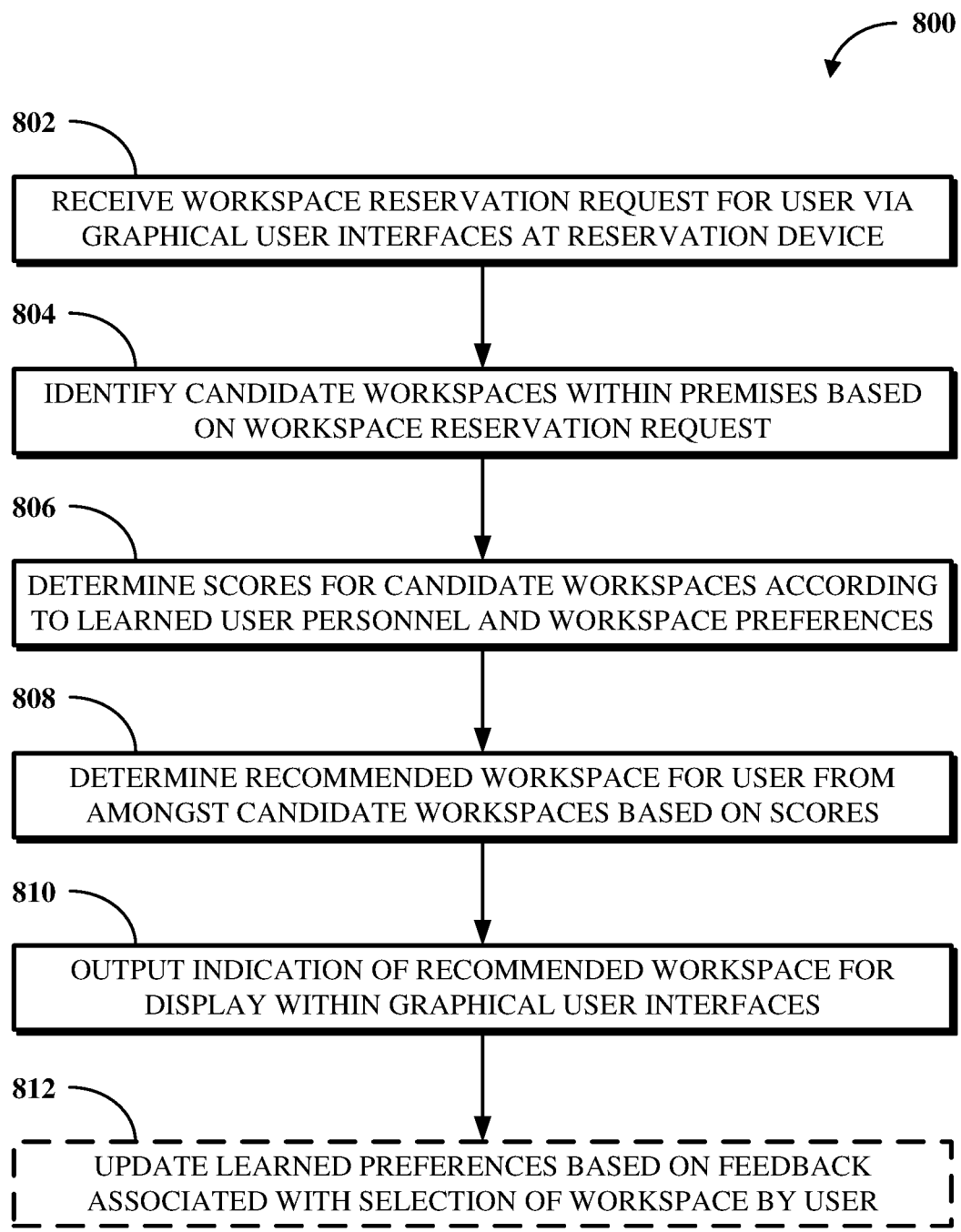
FIG. 8 is a flowchart of an example of a technique for multi-factor available workspace reservation recommendation.

To further describe some implementations in greater detail, reference is next made to examples of techniques which may be performed by or using a system for multi-factor available workspace reservation recommendation. FIG. 8 is a flowchart of an example of a technique 800 for multi-factor available workspace reservation recommendation. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a workspace reservation request for the user is received via one or more graphical user interfaces of workspace reservation software. The one or more graphical user interfaces are presented for display at a reservation device configured to facilitate a reservation of a workspace for a user of a software platform. In some cases, the one or more graphical user interfaces are output for display at a digital signage device located at the premises, and thus the digital signage device is the reservation device. In some cases, the one or more graphical user interfaces are output for display at a personal user device of the user, and thus the personal user device is the reservation device.

At 804, multiple candidate workspaces within the premises are identified based on the workspace reservation request. In some cases, the candidate workspaces include all available (i.e., non-reserved) workspaces at the premises. In some cases, the multiple candidate workspaces are identified by using a filter to exclude one or more of the workspaces at the premises. For example, the filter can cause a pre-processing of the workspaces at the premises to exclude one or more of the workspaces which are next to or nearby a blacklisted person or which are themselves blacklisted workspaces. In another example, the filter can cause a pre-processing of the workspaces at the premises to exclude one or more of the workspaces which are identified for VIP use unless the user is a VIP. Other examples of filters are possible.

At 806, scores are determined for the multiple candidate workspaces according to learned personnel preferences and learned workspace preferences for the user. In particular, the scores are determined for each of the multiple candidate workspaces based on weights defined according to the learned personnel preferences of the user and the learned workspace preferences of the user. Determining the score for a given candidate workspace of the multiple candidate workspaces includes determining a personnel score for a given candidate workspace based on the learned personnel preferences, determining a workspace score for the given candidate workspace based on the learned workspace preferences, and determining the score for the given candidate workspace by combining the personnel score and the workspace score. The weights may, for example, be based on rankings of personnel relationships and workspace preferences specific to the user. Thus, determining the score for a given candidate workspace of the multiple candidate workspaces may be understood to include determining one or more weights to apply to a given candidate workspace based on one or more ranks associated with one or both of the learned personnel preferences or the learned workspace preferences, and applying the one or more weights to the given candidate workspace to determine a score for the given candidate workspace. In one example, a score for a first candidate workspace of the multiple candidate workspaces may be higher than a score for a second candidate workspace of the multiple candidate workspaces where the first candidate workspace is closer to a workspace reserved for another user of the software platform who, according to the learned personnel preferences of the user, is a close contact of the user. In another example, a score for a first candidate workspace of the multiple candidate workspaces may be higher than a score for a second candidate workspace of the multiple candidate workspaces where the first candidate workspace is a workspace which is frequently reserved by the user.

The learned personnel preferences may be determined based on one or both of communication records accessed from within a first data store of a software platform or reservation records accessed from within a second data store of the software platform. For example, the learned personnel preferences may be determined based on one or more of records of real-time communications between the user and other users of the software platform over one or more communication software services of the software platform, a contact list associated with the user, or an office directory identifying a team or department of the user. The learned workspace preferences may be determined based on one or both of workspace records accessed from within a third data store of the software platform or the reservation records. For example, the learned workspace preferences may be determined based on one or more of records of previous selections of workspaces by the user, configurations of the workspaces previously selected by the user, configurations associated with work to perform by the user, or an indication of workspace preferences made by the user via the one or more graphical user interfaces. In some cases, the learned personnel preferences and/or the learned workspace preferences may be determined using a trained machine learning model that inferences against communication records, workspace records, and reservation records stored within one or more data stores of the software platform.

At 808, a recommended workspace for the user is determined from amongst the candidate workspaces based on the scores. In particular, a recommended workspace for the user is determined as a candidate workspace of the multiple candidate workspaces corresponding to a highest one of the scores. In some cases, where two or more of the candidate workspaces share a highest score of the scores, the candidate workspace having a highest rank personnel relationship or workspace preference may be selected as the recommended workspace. In some cases, where all of the candidate workspaces have the same score, a random candidate workspace of the multiple candidate workspaces may be selected as the recommended workspace.

At 810, an indication of the recommended workspace is output for display within the one or more graphical user interfaces of the workspace reservation software. For example, the recommended workspace may be indicated within the one or more graphical user interfaces, for example, by a highlighting or other visual cue drawing attention to the recommended workspace. In some cases, the one or more graphical user interfaces may include an illustrative view of the premises depicting locations of available ones of the workspaces on a map of the premises. In some cases, the one or more graphical user interfaces may include a textual view of the premises describing the available ones of the workspaces in a list or like format.

At 812, optionally, one or both of the learned personnel preferences or the learned workspace preferences for the user are updated based on feedback associated with a selection of a workspace by the user. Updating the learned preferences can include updating one or more of the weights based on feedback associated with a selection by the user of the recommended workspace via the one or more graphical user interfaces. For example, based on a selection by the user of the recommended workspace via the one or more graphical user interfaces, increasing one or more of the weights applied based on the learned personnel preferences of the user or the learned workspace preferences of the user. In another example, based on a selection by the user of a workspace other than the recommended workspace via the one or more graphical user interfaces, decreasing one or more of the weights applied based on the learned personnel preferences of the user or the learned workspace preferences of the user. In some cases, a trained machine learning model used to determine the learned personnel preferences and the learned workspace preferences may be updated based on a selection by the user of the recommended workspace via the one or more graphical user interfaces.

The implementations of this disclosure correspond to methods, non-transitory computer readable media, apparatuses, systems, devices, and the like. In some implementations, a method comprises receiving a workspace reservation request for a user of a software platform, wherein the workspace reservation request is initiated via an interaction by the user with one or more graphical user interfaces displaying information associated with workspaces at a premises, determining scores for each of multiple candidate workspaces identified for the user from amongst available ones of the workspaces based on weights defined according to learned personnel preferences of the user and learned workspace preferences of the user, determining a recommended workspace for the user as a candidate workspace of the multiple candidate workspaces corresponding to a highest one of the scores, and outputting an indication of the recommended workspace for display within the one or more graphical user interfaces in response to the workspace reservation request. In some implementations, a non-transitory computer readable medium stores instructions operable to cause one or more processors to perform operations comprising receiving a workspace reservation request for a user of a software platform, wherein the workspace reservation request is initiated via an interaction by the user with one or more graphical user interfaces displaying information associated with workspaces at a premises, determining scores for each of multiple candidate workspaces identified for the user from amongst available ones of the workspaces based on weights defined according to learned personnel preferences of the user and learned workspace preferences of the user, determining a recommended workspace for the user as a candidate workspace of the multiple candidate workspaces corresponding to a highest one of the scores, and outputting an indication of the recommended workspace for display within the one or more graphical user interfaces in response to the workspace reservation request. In some implementations, an apparatus comprises a memory and a processor configured to execute instructions stored in the memory to receive a workspace reservation request for a user of a software platform, wherein the workspace reservation request is initiated via an interaction by the user with one or more graphical user interfaces displaying information associated with workspaces at a premises, determine scores for each of multiple candidate workspaces identified for the user from amongst available ones of the workspaces based on weights defined according to learned personnel preferences of the user and learned workspace preferences of the user, determine a recommended workspace for the user as a candidate workspace of the multiple candidate workspaces corresponding to a highest one of the scores, and output an indication of the recommended workspace for display within the one or more graphical user interfaces in response to the workspace reservation request.

In some implementations of the method, non-transitory computer readable medium, or apparatus, the method comprises, the operations comprise, and the processor is configured to execute the instructions for, based on a selection by the user of the recommended workspace via the one or more graphical user interfaces, increasing one or more of the weights applied based on the learned personnel preferences of the user or the learned workspace preferences of the user.

In some implementations of the method, non-transitory computer readable medium, or apparatus, the method comprises, the operations comprise, and the processor is configured to execute the instructions for, based on a selection by the user of a workspace other than the recommended workspace via the one or more graphical user interfaces, decreasing one or more of the weights applied based on the learned personnel preferences of the user or the learned workspace preferences of the user.

In some implementations of the method, non-transitory computer readable medium, or apparatus, the method comprises, the operations comprise, and the processor is configured to execute the instructions for determining the learned personnel preferences based on one or more of records of real-time communications between the user and other users of the software platform over one or more communication software services of the software platform, a contact list associated with the user, or an office directory identifying a team or department of the user.

In some implementations of the method, non-transitory computer readable medium, or apparatus, the method comprises, the operations comprise, and the processor is configured to execute the instructions for determining the learned workspace preferences based on one or more of records of previous selections of workspaces by the user, configurations of the workspaces previously selected by the user, configurations associated with work to be performed by the user, or an indication of workspace preferences made by the user via the one or more graphical user interfaces.

In some implementations of the method, non-transitory computer readable medium, or apparatus, a score for a first candidate workspace of the multiple candidate workspaces is higher than a score for a second candidate workspace of the multiple candidate workspaces where the first candidate workspace is closer to a workspace reserved for another user of the software platform who, according to the learned personnel preferences of the user, is a close contact of the user.

In some implementations of the method, non-transitory computer readable medium, or apparatus, a score for a first candidate workspace of the multiple candidate workspaces is higher than a score for a second candidate workspace of the multiple candidate workspaces where the first candidate workspace is a workspace which is frequently reserved by the user.

In some implementations of the method, non-transitory computer readable medium, or apparatus, the one or more graphical user interfaces are output for display at a digital signage device located at the premises.

In some implementations of the method, non-transitory computer readable medium, or apparatus, determining the scores for each of the multiple candidate workspaces comprises determining a personnel score for a given candidate workspace based on the learned personnel preferences, determining a workspace score for the given candidate workspace based on the learned workspace preferences, and determining the score for the given candidate workspace by combining the personnel score and the workspace score.

In some implementations of the method, non-transitory computer readable medium, or apparatus, the method comprises, the operations comprise, and the processor is configured to execute the instructions for updating one or more of the weights based on feedback associated with a selection by the user of the recommended workspace via the one or more graphical user interfaces.

In some implementations of the method, non-transitory computer readable medium, or apparatus, the method comprises, the operations comprise, and the processor is configured to execute the instructions for determining the learned personnel preferences based on one or both of communication records accessed from within a first data store of a software platform or reservation records accessed from within a second data store of the software platform and determining the learned workspace preferences based on one or both of workspace records accessed from within a third data store of the software platform or the reservation records.

In some implementations of the method, non-transitory computer readable medium, or apparatus, the method comprises, the operations comprise, and the processor is configured to execute the instructions for identifying the multiple candidate workspaces by using a filter to exclude one or more of the workspaces at the premises.

In some implementations of the method, non-transitory computer readable medium, or apparatus, the weights are based on rankings of personnel relationships and workspace preferences specific to the user.

In some implementations of the method, non-transitory computer readable medium, or apparatus, the method comprises, the operations comprise, and the processor is configured to execute the instructions for determining the learned personnel preferences and the learned workspace preferences using a trained machine learning model that inferences against communication records, workspace records, and reservation records stored within one or more data stores of the software platform.

In some implementations of the method, non-transitory computer readable medium, or apparatus, the method comprises, the operations comprise, and the processor is configured to execute the instructions for updating a trained machine learning model used to determine the learned personnel preferences and the learned workspace preferences based on a selection by the user of the recommended workspace via the one or more graphical user interfaces.

In some implementations of the method, non-transitory computer readable medium, or apparatus, determining the scores for each of the multiple candidate workspaces comprises determine one or more weights to apply to a given candidate workspace based on one or more ranks associated with one or both of the learned personnel preferences or the learned workspace preferences, and apply the one or more weights to the given candidate workspace to determine a score for the given candidate workspace.

In some implementations of the method, non-transitory computer readable medium, or apparatus, the one or more graphical user interfaces include an illustrative view of the premises depicting locations of available ones of the workspaces.

In some implementations of the method, non-transitory computer readable medium, or apparatus, the one or more graphical user interfaces are output for display at a personal user device of the user.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
predicting, by a processor of a server device based on previous workspace reservation requests, that a user of a software platform will initiate a workspace reservation process at a first time;
determining, by a processor of the server device, learned personnel preferences of the user using a first machine learning model trained based on records of multi-user communications facilitated over one or more communication modalities by software of the software platform and accessed from within a first data store of the software platform to identify a relationship pattern for the user using one or more of the records of the multi-user communications, wherein the learned personnel preferences include a whitelist of persons the user wants to be near during workspace reservations and a blacklist of persons the user does not want to be near during workspace reservations that are generated and updated based on records of past workspace reservations;
determining, by the processor of the server device, learned workspace preferences of the user using a second machine learning model trained based on the records of past workspace reservations and workspace configurations accessed from within a second data store of the software platform to identify a workspace preference pattern for the user using one or more of the records of the past workspace reservations and the workspace configurations;
determining, by the processor of the server device, scores for each of multiple candidate workspaces identified for the user from amongst available workspaces at a premises based on weights representing numerical values defined according to rankings of relationships determined based on the learned personnel preferences and the learned workspace preferences;
determining, by the processor of the server device, a recommended workspace for the user as a candidate workspace of the multiple candidate workspaces corresponding to a highest one of the scores;

transmitting, from the server device to a reservation device, data that, when processed at the reservation device, is configured to cause a display of an indication of the recommended workspace within a graphical user interface output at the reservation device prior to the first time;

receiving direct and indirect feedback from the user about the learned workspace preferences and the learned personnel preferences, wherein the direct feedback includes names to add or remove from the blacklist and the whitelist;

updating, by the processor of the server device, one or more of the weights based on a selection, by the user, of a workspace indicated within the graphical user interface; and updating the learned workspace preferences based on the feedback from the user and based on feedback from multiple users across multiple reservation sessions.

2. The method of claim 1, comprising:
based on a selection by the user of the recommended workspace via the graphical user interface, increasing one or more of the weights applied based on the learned personnel preferences of the user or the learned workspace preferences of the user.

3. The method of claim 1, comprising:
based on a selection by the user of a workspace other than the recommended workspace via the graphical user interface, decreasing one or more of the weights applied based on the learned personnel preferences of the user or the learned workspace preferences of the user.

4. The method of claim 1, comprising:
determining the learned personnel preferences by the first machine learning model evaluating one or both of a contact list associated with the user or an office directory identifying a team or department of the user.

5. The method of claim 1, comprising:
determining the learned workspace preferences by the second machine learning model evaluating one or both of configurations associated with work to be performed by the user or an indication of workspace preferences made by the user via the graphical user interface.

6. The method of claim 1, wherein a score for a first candidate workspace of the multiple candidate workspaces is higher than a score for a second candidate workspace of the multiple candidate workspaces where the first candidate workspace is closer to a workspace reserved for another user of the software platform who, according to the learned personnel preferences of the user, is a close contact of the user.

7. The method of claim 1, wherein a score for a first candidate workspace of the multiple candidate workspaces is higher than a score for a second candidate workspace of the multiple candidate workspaces where the first candidate workspace is a workspace which is frequently reserved by the user.

8. The method of claim 1, wherein the graphical user interface is one of multiple graphical user interfaces output for display at the reservation device as part of a workspace reservation process.

9. The method of claim 1, comprising:
receiving a selection of a workspace for an active reservation;
determining during the active reservation whether the selected workspace is being used by the user; and
updating the learned workspace preferences based on the active reservation if the selected workspace is being used by the user.

10. A non-transitory computer readable medium storing instructions operable to cause one or more processors to perform operations comprising:
predicting, by a processor of a server device based on previous workspace reservation requests, that a user of a software platform will initiate a workspace reservation process at a first time;

determining learned personnel preferences of the user using a first machine learning model trained based on records of multi-user communications facilitated over one or more communication modalities by software of the software platform and accessed from within a first data store of the software platform to identify a relationship pattern for the user using one or more of the records of the multi-user communications, wherein the learned personnel preferences include a whitelist of persons the user wants to be near during workspace reservations and a blacklist of persons the user does not want to be near during workspace reservations that are generated and updated based on records of past workspace reservations;

determining learned workspace preferences of the user using a second machine learning model trained based on the records of past workspace reservations and workspace configurations accessed from within a second data store of the software platform to identify a workspace preference pattern for the user using one or more of the records of the past workspace reservations and the workspace configurations;

determining scores for each of multiple candidate workspaces identified for the user from amongst available workspaces at a premises based on weights representing numerical values defined according to rankings of relationships determined based on the learned personnel preferences and the learned workspace preferences;

determining a recommended workspace for the user as a candidate workspace of the multiple candidate workspaces corresponding to a highest one of the scores;

transmitting data that, when processed at a reservation device, is configured to cause a display of an indication of the recommended workspace within a graphical user interface output at the reservation device prior to the first time;

receiving direct and indirect feedback from the user about the learned workspace preferences and the learned personnel preferences, wherein the direct feedback includes names to add or remove from the blacklist and the whitelist;

updating one or more of the weights based on a selection, by the user, of a workspace indicated within the graphical user interface; and updating the learned workspace preferences based on the feedback from the user and based on feedback from multiple users across multiple reservation sessions.

11. The non-transitory computer readable medium of claim 10, wherein the operations for determining the scores for each of the multiple candidate workspaces comprise:
determining a personnel score for a given candidate workspace based on the learned personnel preferences;
determining a workspace score for the given candidate workspace based on the learned workspace preferences; and determining the score for the given candidate workspace by combining the personnel score and the workspace score.

12. The non-transitory computer readable medium of claim 10, the operations comprising:
updating one or more of the weights based on feedback associated with a selection by the user of the recommended workspace via the graphical user interface.

13. The non-transitory computer readable medium of claim 10, the operations comprising:
identifying the multiple candidate workspaces by using a filter to exclude one or more of the available workspaces.

14. The non-transitory computer readable medium of claim 10, wherein the weights are based on rankings of personnel relationships and workspace preferences specific to the user.

15. An apparatus, comprising:
a memory; and
a processor configured to execute instructions stored in the memory to:
predict, by the processor based on previous workspace reservation requests, that a user of a software platform will initiate a workspace reservation process at a first time;
determine learned personnel preferences of the user using a first machine learning model trained based on records of multi-user communications facilitated over one or more communication modalities by software of the software platform and accessed from within a first data store of the software platform to identify a relationship pattern for the user using one or more of the records of the multi-user communications, wherein the learned personnel preferences include a whitelist of persons the user wants to be near during workspace reservations and a blacklist of persons the user does not want to be near during workspace reservations that are generated and updated based on records of past workspace reservations;
determine learned workspace preferences of the user using a second machine learning model trained based on the records of past workspace reservations and workspace configurations accessed from within a second data store of the software platform to identify a workspace preference pattern for the user using one or more of the records of the past workspace reservations and the workspace configurations;
determine scores for each of multiple candidate workspaces identified for the user from amongst available workspaces at a premises based on weights representing numerical values defined according to rankings of relationships determined based on the learned personnel preferences and the learned workspace preferences;
determine a recommended workspace for the user as a candidate workspace of the multiple candidate workspaces corresponding to a highest one of the scores;
transmit data that, when processed at a reservation device, is configured to cause a display of an indication of the recommended workspace within a graphical user interface output at the reservation device prior to the first time;
receive direct and indirect feedback from the user about the learned workspace preferences and the learned personnel preferences, wherein the direct feedback includes names to add or remove from the blacklist and the whitelist;
update one or more of the weights based on a selection, by the user, of a workspace indicated within the graphical user interface; and
update the learned workspace preferences based on the feedback from the user and based on feedback from multiple users across multiple reservation sessions.

16. The apparatus of claim 15, wherein the processor is configured to execute the instructions to:
update one or both of the first machine learning model or the second machine learning model based on a selection by the user of the recommended workspace via the graphical user interface.

17. The apparatus of claim 15, wherein, to determine the scores for each of the multiple candidate workspaces, the processor is configured to execute the instructions to:
determine one or more weights to apply to a given candidate workspace based on one or more ranks associated with one or both of the learned personnel preferences or the learned workspace preferences; and
apply the one or more weights to the given candidate workspace to determine a score for the given candidate workspace.

18. The apparatus of claim 15, wherein the graphical user interface includes an illustrative view of the premises depicting locations of ones of the available workspaces.

19. The apparatus of claim 15, wherein the graphical user interface is also output for display at a personal user device of the user.

20. The apparatus of claim 15, wherein the weights are based on rankings of the multiple candidate workspaces.

* * * * *

UNITED STATES PATENT AND TRADEMARK OFFICE
CERTIFICATE OF CORRECTION

| | | |
|---|---|---|
| PATENT NO. | : 12,361,337 B2 | Page 1 of 1 |
| APPLICATION NO. | : 17/733405 | |
| DATED | : July 15, 2025 | |
| INVENTOR(S) | : Wing Hong Michael Lam et al. | |

It is certified that error appears in the above-identified patent and that said Letters Patent is hereby corrected as shown below:

On the Title Page

(71) Applicant:
Zoom Video Communications, Inc., San Jose, CA (US)
Should be:
Zoom Communications, Inc., San Jose, CA (US)

Signed and Sealed this
Nineteenth Day of August, 2025

Coke Morgan Stewart
*Acting Director of the United States Patent and Trademark Office*